United States Patent [19]
Segal

[11] Patent Number: 5,413,068
[45] Date of Patent: May 9, 1995

[54] PORTABLE BIRD PLAYGYM

[76] Inventor: Rene Segal, 5900-Camino Del Bol, Boca Raton, Fla. 33433

[21] Appl. No.: 135,259

[22] Filed: Oct. 12, 1993

[51] Int. Cl.$^6$ .......................................... A01K 31/12
[52] U.S. Cl. ..................................... 119/26; 119/706
[58] Field of Search ............... 119/24, 25, 26, 706; 211/202, 1.3

[56] References Cited

U.S. PATENT DOCUMENTS

| | | | |
|---|---|---|---|
| 1,131,128 | 3/1915 | Goodman | 211/202 |
| 1,135,637 | 4/1915 | Yogel | 211/1.3 |
| 1,623,171 | 4/1927 | Doser | 119/24 |
| 1,786,443 | 12/1930 | Moomaw | 119/25 |
| 2,445,403 | 7/1948 | Mayerman | 211/202 |
| 2,562,982 | 8/1951 | Cieri | 211/1.3 |
| 2,582,095 | 1/1952 | Bergeron | 119/24 |
| 4,828,123 | 5/1989 | Basore | 211/202 |
| 5,010,848 | 4/1991 | Rankin | 119/26 |

FOREIGN PATENT DOCUMENTS 207792 2/1960 Australia ........................ 211/202
799469 6/1936 France ........................... 211/202

*Primary Examiner*—Todd E. Manahan
*Attorney, Agent, or Firm*—McHale & Slavin

[57] ABSTRACT

A portable bird playgym according to the present invention has a foldable frame that fits within a suitcase-like container suitable for storage and transportation. In operation, the cover of the container fits beneath the adjoining portion which operates as a catch basin for bird droppings. Disposable liners can be stored in a pouch disposed on the inner surface of the cover. Unfolding of the frame expands the structure providing angular climbing members and traverse support members suitable for exercising and perching. The bottom portion of the structure uses perpendicularly placed extensions to prevent the bird from reaching the catch basin. The top portion of the structure locks the components providing a substantially horizontal perching surface and provides an area for placement of a food and water bowl. A modified walkway is available to form a raised peak for the inquisitive perching bird.

7 Claims, 4 Drawing Sheets

PORTABLE BIRD PLAYGYM

FIELD OF THE INVENTION

The present invention relates generally to the maintenance of birds kept as household pets and, more particularly, to a transportable bird playgym.

BACKGROUND INFORMATION

It is well known that various birds such as parakeets, parrots, cockatiels, canaries and mynahs make excellent pets, many of which are comfortable living in a cage. Parakeets and small parrots become entertaining and affectionate pets. Canaries are valued for their looks and singing ability. The mynah and african grey are wonderful mimics, both of sound effects and the human voice.

Common to these birds is their ability to perch despite various body structures. For instance the parrot, being a member of the psittacine family, has a foot common trait of two toes that stick out in front and two toes that stick out behind. Parrots use their feet like hands to hold food, pick up objects or climb along branches. Their feet design permit standing on circular objects such as tree limbs without effort. In addition, parrots can use their beak as a third hand. Climbing, it uses its beak as a hook securing it to a higher surface and pulling its body up behind. Descending, a parrot leans down, presses its beak onto a lower surface to stabilize itself, then climbs down one foot at a time.

The mynah bird, a member of the passerine family, has a common trait of three toes that stick out in front and one toe that sticks out behind. When a passerine stands on a tree limb, the weight of its body pulls the ligaments of the toes tight thus closing the toes around the limb. Because the tightening does not require a conscious muscular grip, the toes stay tightly curled around the limb even when the bird is fast asleep. For these reasons, prior art teaches tree like structures providing the bird with a means for perching while indoors.

Common to all birds is the need for exercise to stay healthy and to enhance their personality. When kept indoors, medium and large birds such as African Greys and Cockatiels are typically left without a cage but their flight is inhibited making them rely upon other means for exercise. Thus, the design of their perch becomes critical not only to their comfort but as their sole means for exercise. For instance, while small birds may be able to fly from perch to perch for exercise, mynahs are too large to fly indoors but gather sufficient exercise by jumping from perch to perch. Large parrots jump and climb among the perches.

The ideal bird playgym includes multiple perch levels which allow the bird to climb or fly providing both a comfortable area in which to perch and sufficient area in which to exercise. Horizontal levels allow the bird to jump and flex their wings. Swings should be included for entertainment and chew toys for beak strengthening. Long perches provide walkways. A large catch basin is necessary for sanitary purposes. The basin should be secured to the playgym to provide a stationary structure. Finally, a need exists to place at least a portion of the structure upwards of five feet in the air providing the bird with a sensation of safety from other pets and an uninterrupted view of the room.

The problem with perches of the prior art is the lack of exercise area formed in conjunction with the perch making the demands for an ideal playgym a large and awkward structure that cannot be moved or otherwise stored without extensive disassembly and reassembly.

Thus, what is lacking in the art is an apparatus that will accommodate house kept birds providing both an exercise or playgym, a comfortable perch, and a catch basin all of which can be easily stored or otherwise transported from one location to another using a self-contained carrying case.

SUMMARY OF THE INVENTION

The instant invention satisfies the aforementioned needs by disclosing a portable bird playgym that is stored within a narrow case that doubles as the catch basin. During use, the case is opened and the playgym folds out complete with long traversing perches. A series of pivoting hinges places various perches in an upright position which is secured in place by locking the base of the playgym onto the catch basin.

In general, the carrying case has the external appearance similar to that of an oversized brief case complete with carrying handle. The bird playgym is stored within the case by use of a foldable frame preferably constructed of wood. The frame has two sides forming a mirror image of each other defined by a plurality of spaced apart connector elements pivotedly coupled together and operatively associated with traverse support members. In a open position, the catch basin provides support to the structure wherein the connector elements are expanded and the traverse support members provide the perching area.

The bottom portion of each frame side is coupled to the catch basin by use of an upright extension which is slidably coupled to said catch basin and lifts the bottom portion of each frame side a fixed distance above the surface of the catch basin. The distance helps prevent the bird from climbing down into the catch basin as the upright extension is difficult to traverse.

The top portion of the frame sides are locked together by use of a modified connector element having a notched end for placement over one of the traverse support members, the upper portion forming a substantially flat exercise area. The top portion includes dual function walkways that can be used to create a peak by locking the walkways end to end.

Accordingly, an object of the present invention is to provide a full size bird playgym that folds into a storable and transportable carrying case.

Still another object of the instant invention is to provide a playgym that challenges the curiosity of birds, such as parrots, providing a means for keeping the bird mentally alert.

Another object of the present invention is to provide systematic placement of cross support structures allowing birds to climb or jump to adjoining supports without interfering with wing extension, and further provide support for necessities such as food and water.

Still another object of the present invention is to eliminate the need for a separate catch basin and provide an enlarged catch basin surrounding the perimeter of the playgym which doubles as one portion of the storage case.

Yet still another object of the present invention is to provide a means for storing disposable catch basin liners within the carrying case.

Another object of the present invention is to provide walkways that convert into a climbable peak.

Still another object is to provide a means for replacing traverse support members to accommodate the particular size of the bird's feet, and provide for the releasable attachment of climbing devices, play toys, and worn perch supports.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 2:
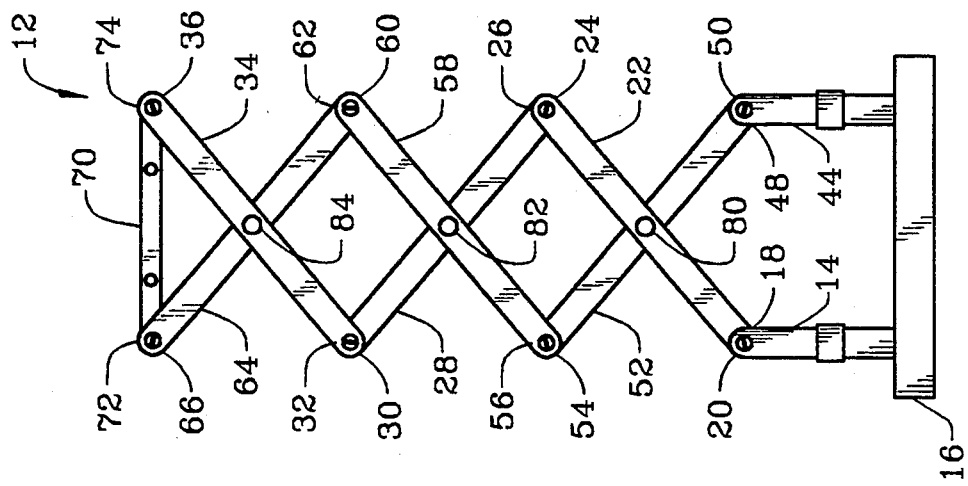
FIG. 2 is a side view of FIG. 1.
Figure 1:
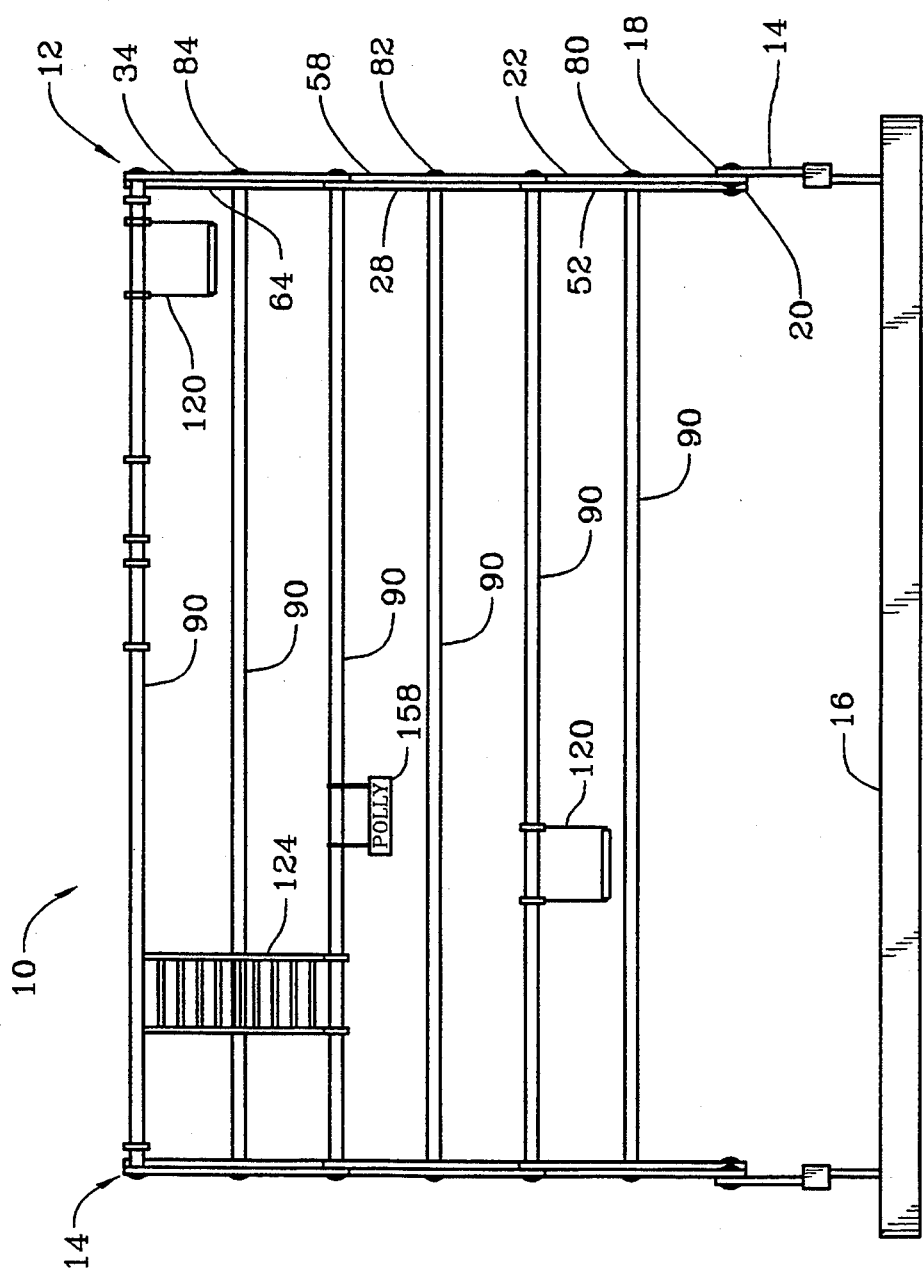
FIG. 1 is a frontal view of the portable bird playgym.

Now referring in general to FIGS. 1 and 2, the portable bird playgym 10 is based upon a first foldable frame side 12 and a second foldable frame side 14 which is a mirror image of the first frame side 12. Frame side 12 provides an accordion type construction that increases in height when the width of the structure is decreased. Frame side 12 is based on an upright extension 14 coupled at one end to catch basin 16 and pivotedly coupled at a second end 18 to lower end 20 of connector element 22. The upper end 24 of connector element 22 is pivotedly coupled to lower end 26 of connector element 28. The upper end 30 of connector element 28 is pivotedly coupled to lower end 32 of connector element 34. Similarly, second upright extension support 44 is coupled at one end to catch basin 16 and pivotedly coupled at a second end 48 to lower end 50 of connector element 52. The upper end 54 of connector element 52 is pivotedly coupled to lower end 56 of connector element 58. The upper end 60 of connector element 58 is pivotedly coupled to a lower end 62 of connector element 64.

In a raised position, the upper end 36 of connector element 34 is held a fixed distance from the upper end 66 of connector element 64 by use of lock bar 70 which is pivotedly coupled to upper end 66 and releasably coupled at the opposite end 74 to upper end 36, a locking mechanism is explained in detail later in this specification. In the preferred embodiment, a total of six connector elements comprise each frame side based on two upright extensions that raise the structure a predetermined distance from the catch basin. Adjoining connector elements 22 and 52, 28 and 58, 34 and 64 are further coupled at the center point, 80, 82, and 84 respectively providing a pivoting point between the adjoining elements. It is noted that the actual number of connector elements and individual lengths are based upon the desired height of the playgym. For example, a Cockatoo may require four 35 inch length connector elements to provide an expansive area of exercise wherein the structure is nearly 7 feet tall. Alternatively, four 10 inch connector elements provide a compact playgym standing less than two feet high suitable for use by parakeets.

Traverse support members 90 provide the horizontal perching surfaces. The support members 90 are coupled to the first frame side 12 and second frame side 14 at first end, second end, and between the first end and second end of each corresponding connector elements. The preferred means for coupling includes a non-metallic dowel pin that allows accordion functionality of frame sides 12 and 14 but prevents rotation of the traverse support members 90 by use of a notched dowel pin that is secured in position upon full extension of the device. The type of dowel pin is further based on the size of the traverse support member 90.

The size of the traverse support member is critical for the comfort of the bird. A perch that is thick at one end narrowing at the other end allows a bird to choose what thickness is most comfortable to stand. For instance, small to medium size birds use ¼ inch to ¾ inch diameter support members. Large birds can use up to 1½ inch with the particular size designed to allow the bird's toenails to dig into the support member as opposed to wrapping around it. The traverse support members are easily exchanged by decoupling and replacing with a support member sized to accommodate the bird's feet. Alternatively, support members can be made of different sizes allowing the bird to determine which support member is most comfortable for perching. Additionally, the individual support member can range in size from one end to the other allowing the bird to determine which area of the support member is most comfortable for perching. Preferably the connector elements and support members are constructed of kiln dried maple or the like hardwood. Alternatively the connector elements and support members are constructed of non toxic materials such as PVC plastic. Plastic perches are less prone to foot infections while wood perches provide a rough texture capable of manicuring the birds toenails.

Figure 3:
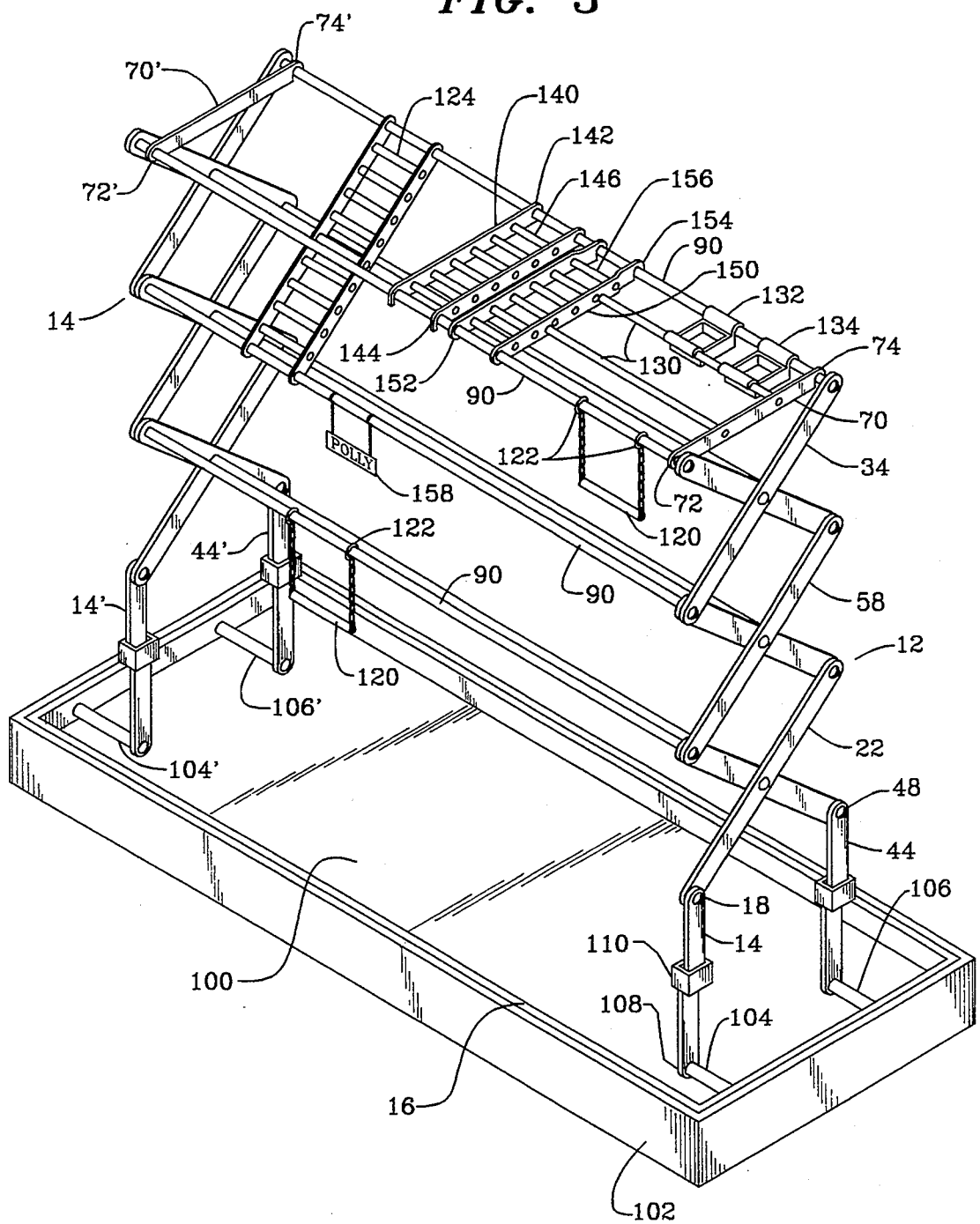
FIG. 3 is a perspective view of the bird playgym in a raised position.

Now referring to FIG. 3, catch basin 16 extends beyond the width and length of frame sides 12 and 14 providing an area to catch droppings. The inner surface of the catch basin can be lined with formica or the like easily cleanable surface. A pocket is provided on the inner surface of cover 102, shown in FIG. 4, to hold disposable liners for placement over the catch basin. Inward placement of first frame side 12 is provided by enlarged bosses 104 and 106 securing upright extensions 14 and 44 respectively. The top end 18 of upright extension 14 is pivotedly coupled to lower end of connector element 22 and the bottom end 108 pivotedly coupled to the separation boss 104. A slide sleeve 110 provides the upright extension 14 with a means for locking the upper and lower portions of extension 14 in a vertical position. It should be noted that the slide sleeve 110 is typical of the four upright extensions and illustrates but one method of locking the upright extension yet retain a pivot point to allow folding of the structure within the carrying case. Variations to the locking sleeve are deemed within the scope of this invention.

Removal of the traverse support members 90 from either frame side permits the inclusion of various toys and/or exercise equipment directly to the support member 90. Swing 120 is shown using a closed ring attachment 122 which is slid along the length of the support member 90 to an appropriate area. Similarly, a ladder 124 can be placed between support members 90 in such a manner so as not to interfere with the folding of the structure yet allow bird traversal from one support member to a second support member on another level.

As previously described, the upper portion of the structure utilizes a lock bar 70 which is rotatably coupled at one end 72 and notched at the opposite end 74 which hooks over the outermost traverse support member 90. The opposite side of the traverse support member finds a second lock bar 70' which is rotatably coupled at one end 72' and releasably coupled at the opposite end 74' by use of a mirror image notch which also hooks over the outermost traverse support member 90. In between the lock bars 70 and 70' support members 130 provide additional perching areas and a horizontal jumping location. A water bowl 132 and a food bowl 134 using a hook over attachment sets between the horizontally positioned traverse support members.

Figure 5:
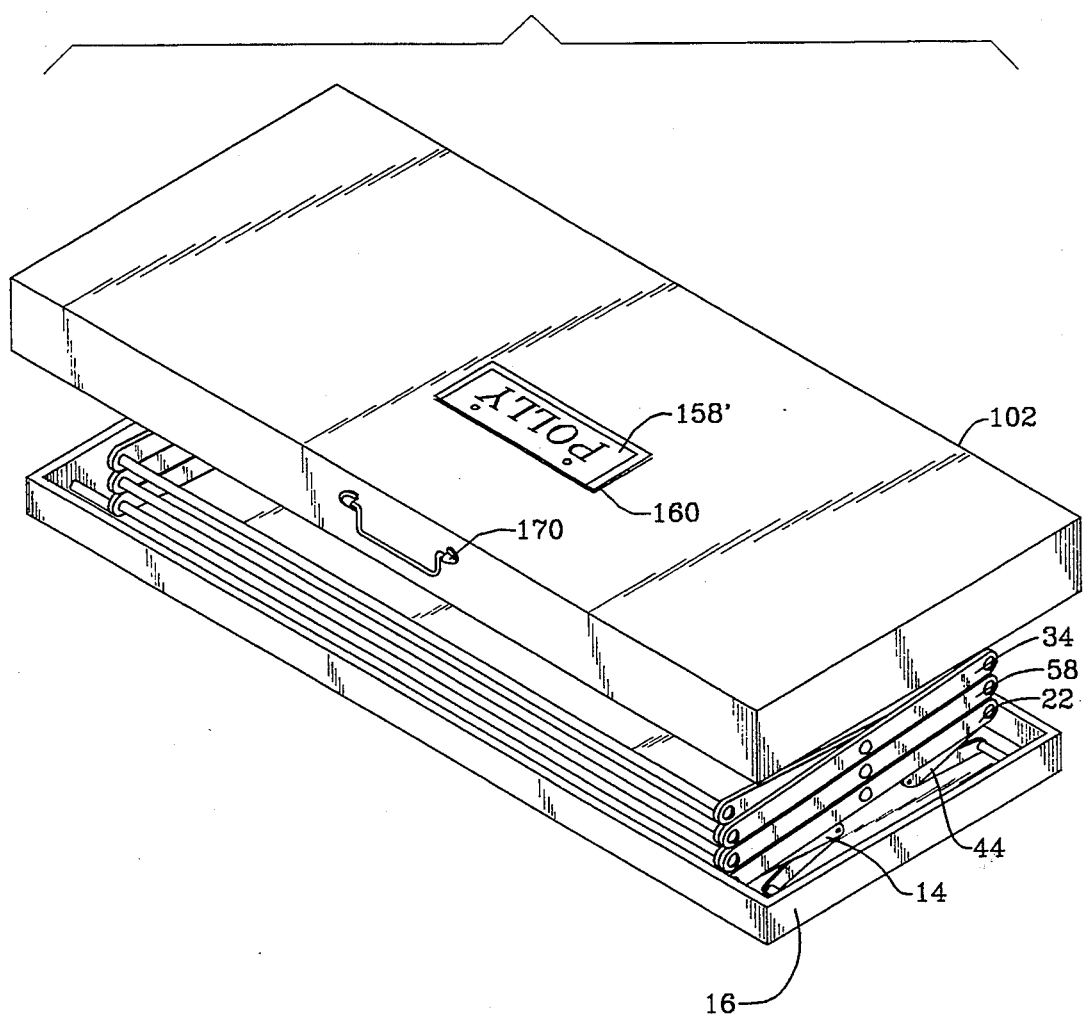
FIG. 5 is a perspective view of the portable bird playgym with the cover in a position for enclosing the catch basin and folded structure.

A nameplate 158 can be transferred from the cover 102 of the storage container, as illustrated in FIG. 5, providing identification and personalization of the bird. Attachment is performed by temporarily loosening one of the traverse support members and sliding the nameplate with the necessary hanging support along the length of the member.

Horizontal walkway 140 functions in a similar fashion as the lock bars 70, 70' when placed in a flat position wherein one end of the walkway 142 is rotatably coupled to one support member and the opposite end 144 employs notches which hook over the opposite traverse support member. The walkway 140 has a plurality of spaced apart dowels 146 allowing the bird to comfortably traverse the support members. For purposes described below, a second walkway is provided which also functions like a lock bar while in a flat position wherein one end of the walkway 152 is rotatably coupled to a support member and the opposite end 154 is available to hook over the opposite traverse support member 90. Opposite end 154 is slightly indented narrowing the width to a distance less than end 144. Walkway 150 also includes a plurality of spaced apart dowels 156 allowing the bird to traverse the support members.

Figure 4:
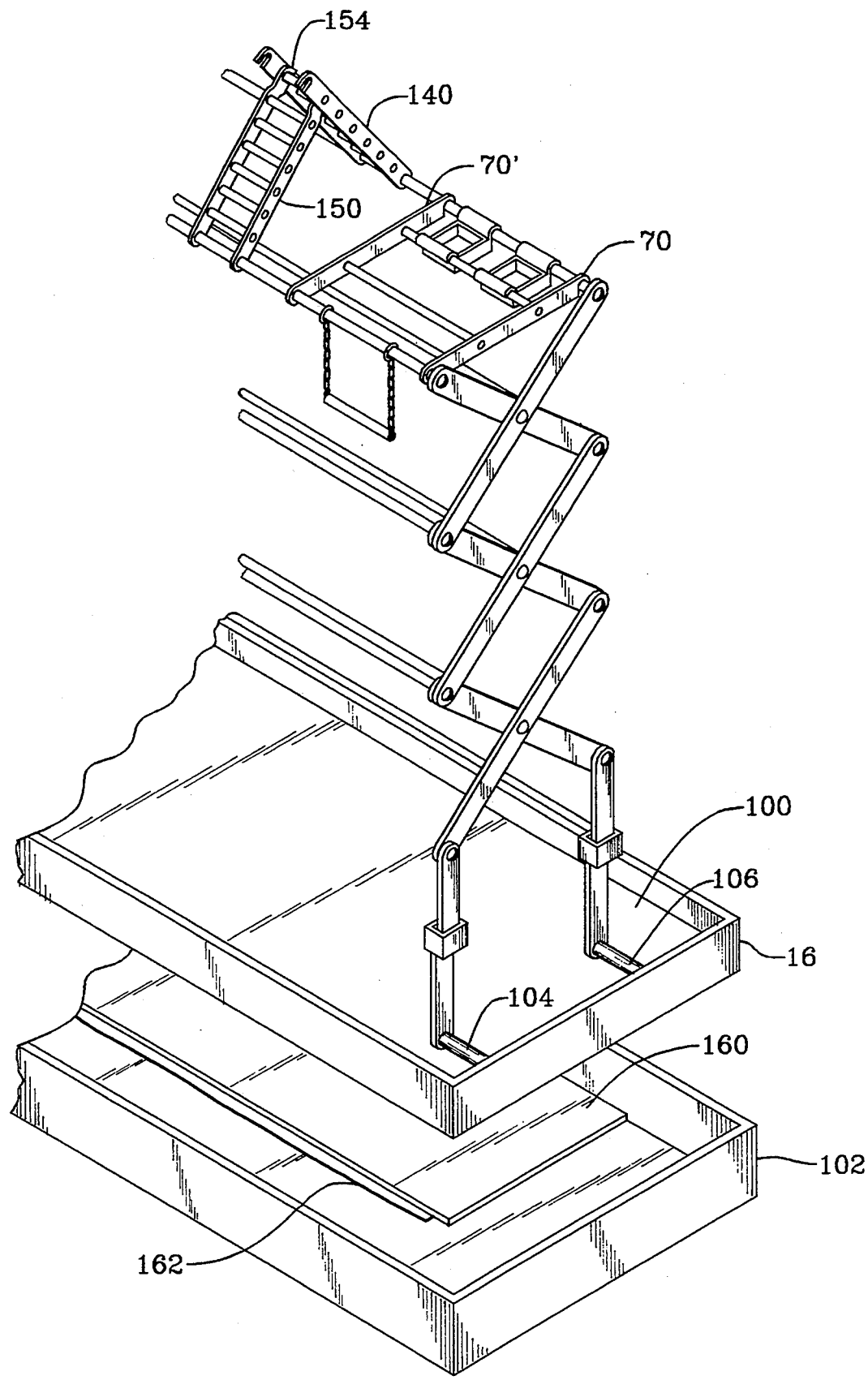
FIG. 4 is a partial view of FIG. 3 illustrating placement of the cover and employment of raised walkways.

Referring to FIG. 4, placement of horizontal walkway 140 in an upright position is accomplished by allowing the walkway 150 to hook over one of the dowels 146 by use of hooked end 154 which is spaced apart to accommodate the dowels. When the walkways 140, 150 are joined together they provide a perch for inquisitive birds that seek the highest point on a structure. The height of the perch is made adjustable by placement of hooked end 154 to any of the various dowels 146.

Cover 102 is shown in a partially exploded view together with catch basin 100. The cover includes a pouch 160 for storing disposable catch basin lining papers 162. The lining papers can be used to cover the inner surface 100 of the catch basin. The support bosses 104 and 106 are secured above the inner surface 100 allowing placement of the lining paper beneath each boss. The illustrated embodiment sets lock bar 70' near primary lock bar 70 to permit use of the aforementioned water and food bowls and provide a large jumping distance between supports on the remainder portion of the upper horizontal support area.

FIG. 5 illustrates the instant invention in a folded position placed within catch basin 16 with cover 102 in the process of being secured to the catch basin 16. Connector elements 22, 58 and 34 are folded tightly against one another providing a compact storage container. Upright extensions 14 and 44 are shown in their inwardly folded position allowing clearance of the container side walls. Nameplate 158' can be transferred from the support member providing identification and personalization of the container by sliding the nameplate into holder 160. Handle 170 allows the closed container to be transported in a manner similar to a brief or suit case.

It is to be understood that while I have illustrated and described certain forms of the invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification. Various knee shroud attachments and means for articulation are deemed within the scope of this invention.

What I claim is:

1. A portable bird playgym comprising:
   a foldable first frame side and a foldable second frame side, each frame side having an accordion structure comprised of a top portion, a bottom portion, and a plurality of spaced apart connector elements pivotally coupled therebetween;
   means for positioning said first frame side and said second frame side a horizontal distance apart, said menas for positioning being suitable as perching surfaces for a bird;
   a catch basin operatively adapted for catching bird droppings being coupled to said bottom portion of said frame sides having an upright extension lifting said bottom portion of each said frame side a suitable distance above an inner surface of said catch basin to inhibit a bird from climbing down into said catch basin; and
   a means for locking said top portion of said frame sides a vertical distance from said bottom portion and stably maintaining said vertical distance while a bird moves from perch to perch.

2. The apparatus according to claim 1 wherein; said top portion is spaced from said bottom portion of each frame side a distance greater than four feet when in an unfolded position.

3. A portable bird playgym comprising:
   a foldable first frame side and a foldable second frame side, each frame side having an accordion structure comprised of a top portion, a bottom portion, and a plurality of spaced apart connector elements each having a first end and a second end pivotedly coupled between said top portion and said bottom portion;
   a plurality of equal length traverse support members;
   means for coupling said traverse support members between said first frame side and said second frame side at said first end, said second end, and between said first end and said second end of said connector elements;
   a catch basin operatively adapted for catching bird droppings;
   an upright extension coupled to said catch basin lifting said bottom portion of each said frame side a suitable distance above said catch basin to inhibit a bird from climbing down into said catch basin;

means for pivotally coupling said bottom portion of said frame sides to said catch basin;

means for locking said top portion of said frame sides a vertical distance from said bottom portion and stably maintaining said vertical distance while a bird moves from perch to perch; and a cover operatively adapted for enclosing said catch basin with said frame sides and said connector elements folded therein;

whereby said catch basin operates to house said frame sides and said connector elements in a folded position allowing said cover to attach to said catch basin forming a storage container, wherein removal of said cover permits raising said top portion permitting an accordion stance of said frame sides a vertical distance above said bottom portion, said frame sides locked into a predetermined position so as to secure said top portion a fixed distance above said bottom portion, said frame sides and said traverse support members available for perching by a bird with said catch basin available to retain droppings.

4. The portable bird playgym according to claim 3 wherein said connector elements and said traverse support members are constructed of kiln dried maple wood.

5. The portable bird playgym according to claim 3 wherein said traverse support members are further defined as having a first end and a second end, said first end having a larger diameter than said second end.

6. The portable bird playgym according to claim 3 including a first pair of parallel bars having one end coupled to a traverse support member and the opposite end including a means for releasably coupling to a second traverse support member, said first pair of parallel bars having a plurality of dowels disposed therebetween and spaced so as to allow a bird to comfortably traverse thereacross.

7. The device according to claim 6 wherein a second pair of parallel bars with a plurality of dowels disposed therebetween, similar to said first pair, includes a means for engaging a free end of said second pair of parallel bars to one of said dowels disposed between said first pair of parallel bars, thereby forming an adjustable peak.

* * * * *